United States Patent [19]
Zhang et al.

[11] Patent Number: 5,938,715
[45] Date of Patent: Aug. 17, 1999

[54] METHOD FOR MONITORING THE CONVERSION CAPACITY OF A CATALYTIC CONVERTER

[75] Inventors: Hong Zhang; Johannes Beer, both of Regensburg, Germany

[73] Assignee: Siemens Aktiengesellschaft, Munich, Germany

[21] Appl. No.: 09/056,380

[22] Filed: Apr. 7, 1998

[51] Int. Cl.[6] .......................... G01M 15/00; F01N 09/00
[52] U.S. Cl. ........................... 701/109; 73/118.1; 60/277
[58] Field of Search ..................... 701/109; 73/23.31, 73/23.32, 118.1, 116, 117.2, 117.3; 60/276, 277

[56] References Cited

U.S. PATENT DOCUMENTS

| | | | |
|---|---|---|---|
| 5,428,956 | 7/1995 | Maus et al. | 60/277 |
| 5,431,011 | 7/1995 | Casarella et al. | 73/118.1 |
| 5,590,521 | 1/1997 | Schnaibel et al. | 73/118.1 |
| 5,626,014 | 5/1997 | Hepburn et al. | 60/277 |
| 5,632,144 | 5/1997 | Isobe | 60/277 |
| 5,647,205 | 7/1997 | Wier et al. | 60/276 |
| 5,649,420 | 7/1997 | Mukaihira et al. | 60/277 |
| 5,675,967 | 10/1997 | Ries-Mueller | 60/277 |
| 5,729,971 | 3/1998 | Matsuno et al. | 60/277 |
| 5,758,310 | 5/1998 | Kato | 701/109 |
| 5,787,705 | 8/1998 | Thoreson | 73/118.1 |

FOREIGN PATENT DOCUMENTS

| | | |
|---|---|---|
| 4039738A1 | 6/1991 | Germany . |
| 4122787A1 | 1/1992 | Germany . |
| 4243339A1 | 6/1993 | Germany . |

OTHER PUBLICATIONS

"Konzept zur Katalysatorüberwachung durch Reaktionswärmeermittlung", Grigorios C. Koltsakis et al., MTZ Motortechnische Zeitschrift 58, 1997, pp. 178–184.

*Primary Examiner*—George Dombroske
*Attorney, Agent, or Firm*—Herbert L. Lerner; Laurence A. Greenberg

[57] ABSTRACT

A method for monitoring the conversion capacity of a catalytic converter assesses a conversion capacity of a preliminary catalytic converter by calculating thermal energy generated in a reference catalytic converter that is not catalytically coated in accordance with a temperature model and making a comparison with a measured thermal energy generated in the preliminary catalytic converter. A measure of the conversion capacity of the preliminary catalytic converter is ascertained from the difference, and it is compared with a comparison value. The preliminary catalytic converter has an adequate conversion capacity if the difference is above the comparison value.

12 Claims, 2 Drawing Sheets

METHOD FOR MONITORING THE CONVERSION CAPACITY OF A CATALYTIC CONVERTER

BACKGROUND OF THE INVENTION

Field of the Invention

The invention relates to a method for monitoring the conversion capacity of a catalytic converter for an internal combustion engine, in which an inlet temperature of exhaust gas is measured upstream of the catalytic converter; a first outlet temperature of the exhaust gas is measured downstream of the catalytic converter; a second outlet temperature is calculated from the inlet temperature, according to a temperature model; and the first outlet temperature and the second outlet temperature are compared, and the conversion capacity of the catalytic converter is assessed on the basis of the comparison.

Legal requirements demand that the conversion capacity of a catalytic converter of an internal combustion engine be monitored during operation in the motor vehicle itself with suitable self-diagnosis.

It is known from an article entitled "Konzept zur Katalysatorüberwachung durch Reaktionswärmeermittlung" [Concept for Catalytic Converter Monitoring by Ascertaining Reaction Heat] by Grigorios C. Koltsakis, et al., in MTZ, 58, 1997, p. 178–184, to use reaction heat generated in the catalytic converter by the catalytic reaction, as a measure for diagnosing the conversion capacity of the catalytic converter. The temperature upstream of the catalytic converter and the temperature downstream of the catalytic converter are measured and the reaction heat in the catalytic converter is calculated from them, which represents a measure of the conversion capacity of the catalytic converter.

A device for monitoring the degree of conversion of an exhaust gas catalytic converter even under unstable operating conditions is known from German Published, Non-Prosecuted Patent Application DE 41 22 787 A1. The exhaust gas temperature is ascertained at a point downstream of the catalytic converter through the use of a temperature sensor and is delivered to an evaluation unit. The evaluation unit also communicates with the output of a computer, which operates as a function of signals of a temperature sensor upstream of the catalytic converter and a sensor for the respective flow rate and as a function of the catalytic converter geometry, to calculate the temperature that would be established at the site of the temperature sensor downstream of the catalytic converter if the catalytic converter were inoperative. The evaluation unit furnishes a signal for the applicable degree of conversion from the difference between the two temperature signals.

SUMMARY OF THE INVENTION

It is accordingly an object of the invention to provide a method for monitoring the conversion capacity of a catalytic converter, which overcomes the hereinafore-mentioned disadvantages of the heretofore-known methods of this general type.

With the foregoing and other objects in view there is provided, in accordance with the invention, a method for monitoring the conversion capacity of a catalytic converter for an internal combustion engine, which comprises measuring an inlet temperature of an exhaust gas upstream of a catalytic converter; measuring a first outlet temperature of the exhaust gas downstream of the catalytic converter; calculating a second outlet temperature from the inlet temperature according to a temperature model; comparing the first outlet temperature and the second outlet temperature, and assessing a conversion capacity of the catalytic converter on the basis of the comparison; and utilizing the second outlet temperature to determine a conversion capacity of a raw emissions catalytic converter having no catalytic coating and operating under substantially the same conditions as the catalytic converter.

Precise determination of the conversion capacity of the catalytic converter is attained by comparing the first outlet temperature of the exhaust gas, which is present downstream of the catalytic converter, with a second outlet temperature.

The second outlet temperature is equivalent to the outlet temperature that prevails under the same operating conditions downstream of a raw emissions catalytic converter, wherein the raw emissions catalytic converter is a catalytically uncoated catalytic converter. The outlet temperature downstream of the raw emissions catalytic converter is calculated from the measured inlet temperature upstream of the catalytic converter, using a temperature model. A statement is made about the conversion capacity of the catalytic converter from the difference in temperature between the first and second outlet temperatures.

A fundamental concept of the invention is based upon using the energy generated in the catalytic converter, in comparison with a raw emissions catalytic converter, as a measure of the conversion capacity.

In accordance with another mode of the invention, there is provided a method which comprises calculating the energy catalytically produced in the catalytic converter from the first and second outlet temperatures, and using the calculated energy as a measure for assessing the conversion capacity.

In accordance with a further mode of the invention, there is provided a method which comprises integrating the calculated energy over a predetermined temperature range, and using the integrated energy as a measure of the conversion capacity of the catalytic converter.

In accordance with an added mode of the invention, there is provided a method which comprises performing the step of calculating the second outlet temperature by taking into account an exhaust gas flow rate composed of a secondary air flow rate, an aspirated engine air flow rate and a quantity of fuel supplied.

In accordance with an additional mode of the invention, there is provided a method which comprises performing the step of calculating the second outlet temperature by taking into account energy output by at least one of convection and radiation by the raw emissions catalytic converter.

In accordance with yet another mode of the invention, there is provided a method which comprises performing the step of assessing the conversion capacity of the catalytic converter by assessing a first part, in particular a preliminary catalytic converter, located at an inlet of the catalytic converter in terms of a flow direction of the exhaust gas.

In accordance with yet a further mode of the invention, there is provided a method which comprises performing the integrating step only beyond an initial temperature above 50° C. and in particular above 100° C.

In accordance with yet an added mode of the invention, there is provided a method which comprises performing the integrating step up to a maximum temperature of 350° C. and preferably 200° C.

In accordance with yet an additional mode of the invention, there is provided a method which comprises calculating an exothermic energy of a comparison catalytic converter by using the same steps and the same temperature model as for the catalytic converter; barely meeting a predetermined emissions standard with the comparison catalytic converter; and assessing the catalytic converter as having adequate conversion capacity if the exothermic energy of the catalytic converter is greater than the exothermic energy of the comparison catalytic converter.

With the objects of the invention in view, there is also provided a method for monitoring a catalytic converter, which comprises ascertaining energy generated in a catalytic converter during operation of an internal combustion engine; ascertaining energy generated under the same operating conditions in a raw emissions catalytic converter having no catalytic coating; and comparing the energy generated in the catalytic converter and the energy generated in the raw emissions catalytic converter to make a statement about a conversion capacity of the catalytic converter.

Other features which are considered as characteristic for the invention are set forth in the appended claims.

Although the invention is illustrated and described herein as embodied in a method for monitoring the conversion capacity of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
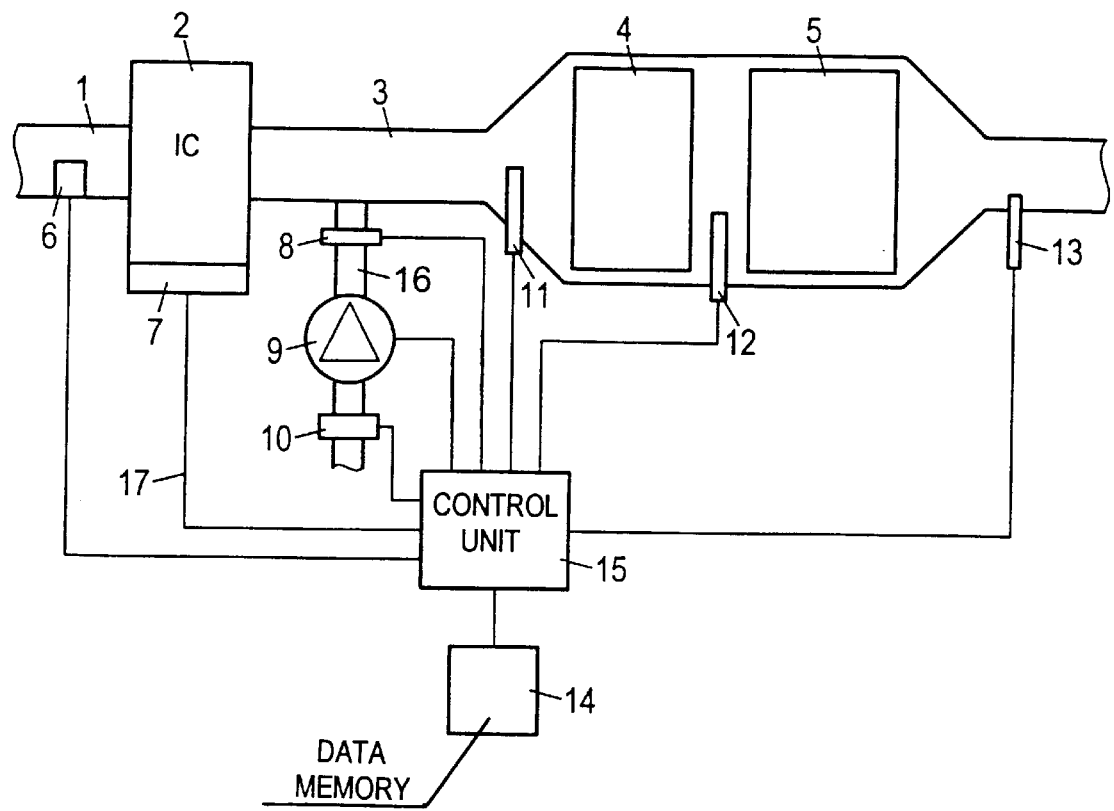
FIG. 1 is a schematic and diagrammatic representation of a layout of an exhaust gas cleaning system.

Referring now to the figures of the drawings in detail and first, particularly, to FIG. 1 thereof, there is seen an internal combustion engine 2 with an injection system 7, which is connected to an intake tract or pipe 1 and an exhaust gas pipe or tract 3. A preliminary catalytic converter 4 and a main catalytic converter 5 separate from and following the preliminary catalytic converter 4 in the flow direction, are provided in the exhaust gas tract 3. A first temperature sensor 11 is mounted upstream of the preliminary catalytic converter 4, and a second temperature sensor 12 is mounted in the exhaust gas tract 3 between the preliminary catalytic converter 4 and the main catalytic converter 5. A lambda sensor 13 is disposed in the exhaust gas tract 3 downstream of the main catalytic converter 5.

A secondary air supply line 16 discharges into the exhaust gas tract 3 between the engine 2 and the preliminary catalytic converter 4. A valve 8, a secondary air pump 9 and a second air flow rate meter 10 are disposed in the secondary air supply line 16.

A first air flow rate meter 6 which is installed in the intake tract 1 communicates over a signal line with a control unit 15 that has a data memory 14. The control unit 15 communicates with the engine 2 and the injection system 7 through a data bus 17. The control unit 15 also communicates through signal lines with the second air flow rate meter 10, the first temperature sensor 11, the second temperature sensor 12, and the lambda sensor 13. The secondary air pump 9 and the valve 8 are connected to the control unit 15 through trigger lines.

The control unit 15 controls the injection to the engine 2 and the delivery of secondary air to the exhaust gas tract 3, as a function of the engine air mass delivered and of the exhaust gas composition downstream of the main catalytic converter 5.

The control unit 15 measures the inlet temperature upstream and the outlet temperature downstream of the preliminary catalytic converter 4. Next, the control unit 15 uses the inlet temperature and a temperature model to calculate a second outlet temperature, which would prevail downstream of a raw emissions catalytic converter through which the same exhaust gas flow rate at the same inlet temperature would flow as in the preliminary catalytic converter 4. The raw emissions catalytic converter acts as a reference catalytic converter, which has an identical construction to the preliminary catalytic converter 4 except that it lacks a catalytic coating and thus does not catalytically generate any exothermic thermal energy.

The control unit 15 then calculates the thermal energy exothermally generated in the preliminary catalytic converter, from the first and second outlet temperatures. The exothermic thermal energy is a measure of the quality of the conversion capacity of the preliminary catalytic converter 4.

Figure 2:
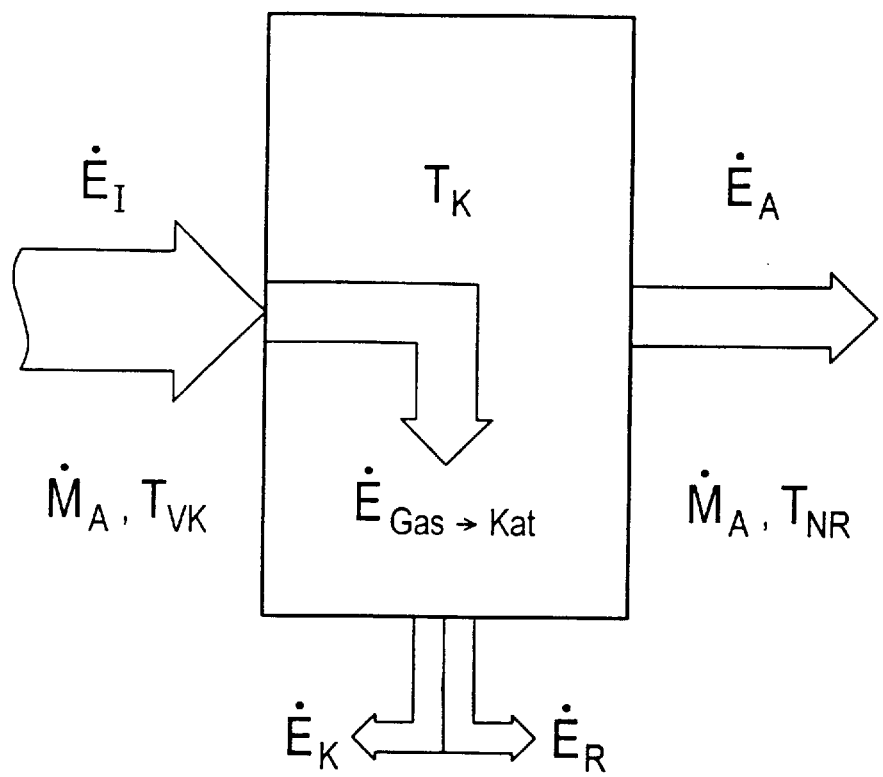
FIG. 2 is a theoretical model for calculating an outlet temperature downstream of a raw emissions catalytic converter.

FIG. 2 schematically shows the model by which the outlet temperature of the raw emissions catalytic converter is calculated. The energy balance of a catalytic converter is the result of a thermal output $\dot{E}_I$, which is supplied to the catalytic converter at an exhaust gas flow rate $\dot{M}_A$ that has an inlet temperature $T_v$. In the catalytic converter, a transfer of energy takes place from the exhaust gas to the catalytic converter. In this process, the catalytic converter warms up to a catalytic converter temperature $T_K$. This is represented symbolically as an output transfer $\dot{E}_{Gas\_Kat}$. Moreover, the catalytic converter outputs a convection output $\dot{E}_K$ and a radiation output $\dot{E}_R$ to the environment. At the same time an energy output $\dot{E}_A$ is taken out of the catalytic converter with the exhaust gas.

The outlet temperature of the exhaust gas $T_{NR}$ prevailing downstream of the raw emissions catalytic converter is calculated through the use of this temperature model. The raw emissions catalytic converter is equivalent in construction to the preliminary catalytic converter 4, but in contrast to the preliminary catalytic converter 4 it has no catalytic coating.

The outlet temperature $T_{NR}$ of the exhaust gas stream downstream of the raw emissions catalytic converter is calculated from the inlet temperature $T_v$ and the exhaust gas flow rate $\dot{M}_A$, based on the energy balance equation of the uncoated raw emissions catalytic converter. The inlet temperature $T_v$ is measured with the first temperature sensor 11 upstream of the preliminary catalytic converter 4. The exhaust gas flow rate $\dot{M}_A$ is determined from the aspirated engine air and the delivered secondary air, which are measured with the first air flow rate meter 6 and the second air flow rate meter 10, respectively.

The energy stream $\dot{E}_{in}$ delivered to the preliminary catalytic converter 4 is calculated by equation 1 as follows:

$$\dot{E}_{in} = \dot{M}_A \cdot T_{VK} \cdot c_A, \quad (1)$$

in which $\dot{M}_A$ designates the exhaust gas flow rate, $T_{VK}$ designates the measured inlet temperature of the exhaust upstream of the preliminary catalytic converter 4, and $c_A$ designates the specific thermal output of the exhaust gas at a constant pressure.

The exhaust gas flow rate $\dot{M}_A$ is calculated by equation 2 using the following formula:

$$\dot{M}_A = (1 + 1/C_S) \cdot \dot{M}_{LM} + \dot{M}_{SLM}, \quad (2)$$

in which $\dot{M}_{SLM}$ represents the secondary air flow rate, $\dot{M}_{LM}$ the engine air flow rate, and $C_S$ is a coefficient for the delivered fuel quantity, which at $\lambda = 1$ has a value of 14.3.

The output transfer $\dot{E}_{Ab}$ from the exhaust gas to the catalytic converter monolith is described by equation 3:

$$\dot{E}_{Ab} = \dot{M}_A \cdot k_1 \cdot A_M (T_{VK} - T_K) \quad (3)$$

in which $k_1$ is the heat transfer coefficient from the exhaust gas to the catalytic converter monolith, $A_M$ is the surface area of the catalytic converter monolith around which exhaust gas flows, and $T_K$ is the temperature of the catalytic converter monolith.

The heat flow $\dot{E}_R$ output by the raw emissions catalytic converter is obtained from equation 4 through the use of Boltzmann's Radiation Law:

$$\dot{E}_R = A_O \cdot k_n \cdot (T_k^4 - T_U^4), \quad (4)$$

in which $A_O$ stands for the outer surface area of the catalytic converter, $k_B$ stands for Boltzmann's Constant, $T_U$ is the ambient temperature, and $T_K$ is the catalytic converter temperature.

A convection flow that is output by convection by the raw emissions catalytic converter is described by equation 5:

$$\dot{E}_K = A_O \cdot k_2(v) \cdot (T_K - T_U) \quad (5)$$

in which $\dot{E}_K$ stands for the convection output, $A_O$ the outer surface area of the catalytic converter, and a constant $k_2(v)$ is the heat transfer coefficient from the surface of the catalytic converter to the ambient air as a function of the vehicle speed v. The constant $k_2$ is applied as a function of the vehicle speed.

A first order differential equation is obtained from the output balance equation for the temperature $T_K$ of the raw emissions catalytic converter in accordance with equation 6:

$$\dot{T}_K = \frac{1}{m_K \cdot c_K} (\dot{E}_{Ab} - \dot{E}_R - \dot{E}_K) \quad (6)$$

in which $m_K$ stands for the mass of the catalytic converter monolith, and $c_K$ stands for the specific thermal output of the catalytic converter monolith.

Finally, the outlet temperature $T_{NR}$ of the raw emissions catalytic converter is calculated from equations 6 and 3 by equation 7:

$$T_{NR} = \frac{\dot{E}_1 - \dot{E}_{Ab}}{c_A \cdot \dot{M}_A} \quad (7)$$

Figure 3:
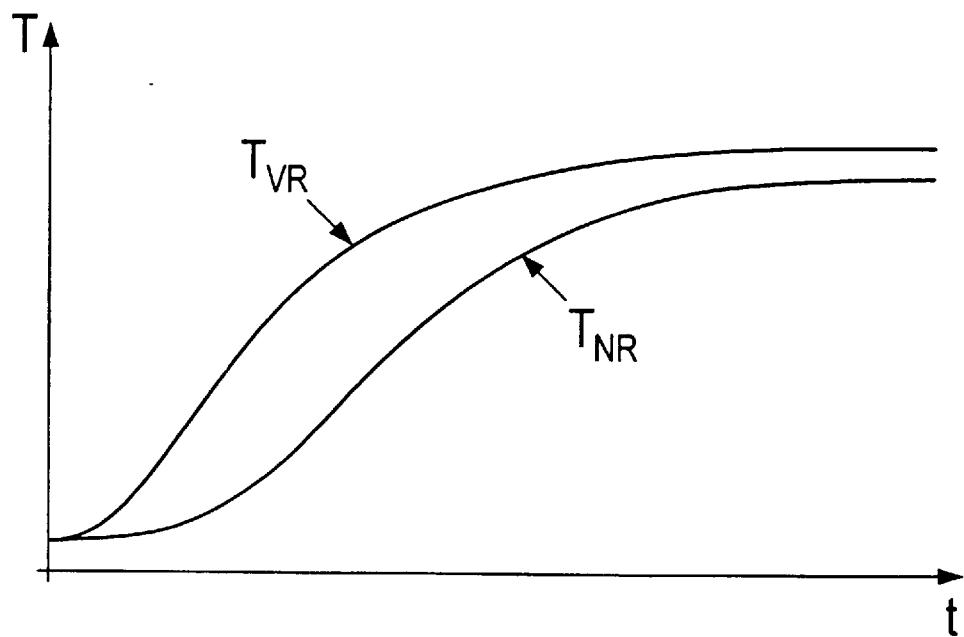
FIG. 3 is a graph of a temperature course upstream and downstream of the raw emissions catalytic converter.

FIG. 3 shows the measured inlet temperature $T_{VR}$ upstream of the raw emissions catalytic converter and the second outlet temperature $T_{NR}$ calculated therefrom downstream of the raw emissions catalytic converter as a function of time t, and thus it shows the temperature transfer behavior of the raw emissions catalytic converter.

In order to provide an optimal temperature model for calculating the second outlet temperature $T_{NR}$ for the raw emissions catalytic converter, temperature courses of the raw emissions catalytic converter are measured on an engine test bench and used to adapt model parameters $k_1$, $k_2$, $k_b$ and $c_K$ accordingly, so that an incident error between the temperature model and the actual heating of the raw emissions catalytic converter is minimized.

Through the use of the calculated second outlet temperature $T_{NR}$ downstream of the raw emissions catalytic converter and the first outlet temperature $T_{NK}$ measured downstream of the preliminary catalytic converter 4 using the second temperature sensor 12, the exothermic output $\dot{E}_E$ generated in the preliminary catalytic converter is calculated as follows from equation 8:

$$\dot{E}_E(t) = (T_{NK} - T_{NR}) \cdot \dot{M}_A \cdot c_A, \quad (8)$$

in which $c_A$ designates the specific thermal output of the exhaust gas.

The exothermic output $\dot{E}_E$ is a measure of the conversion capacity of the preliminary catalytic converter, since the exothermic output becomes greater, as the catalytic activity of the preliminary catalytic converter is increased. The thermal energy $E_E$ generated in the preliminary catalytic converter 4 may also be used instead of the exothermic output.

Figure 4:
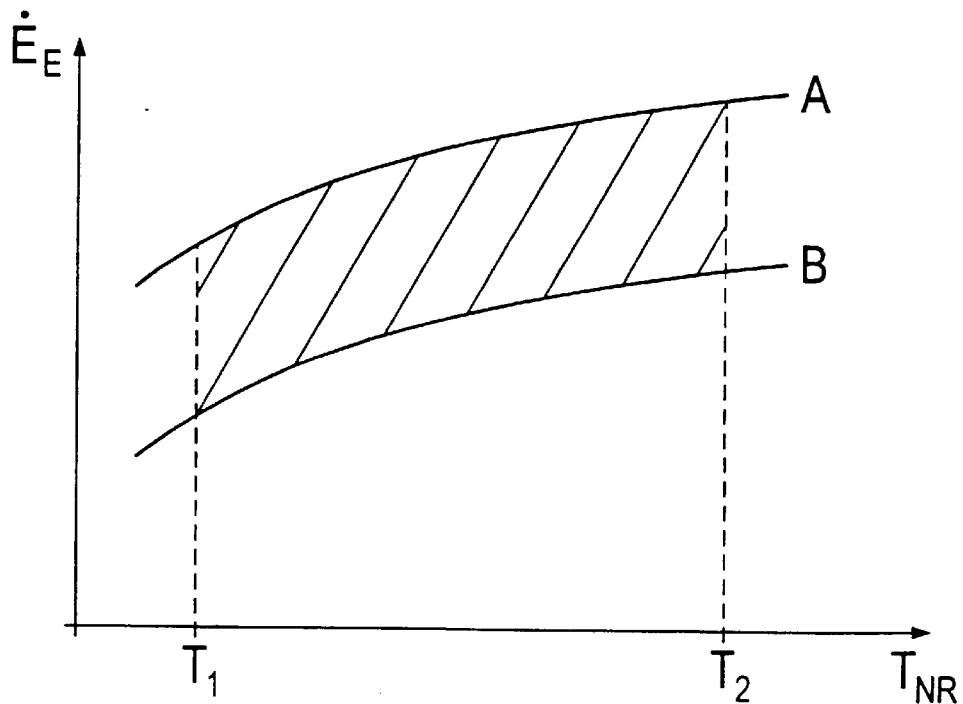
FIG. 4 is a graph showing a thermal output being generated as a function of the catalytic converter temperature.

FIG. 4 shows the exothermic output $\dot{E}_E$ plotted over the second outlet temperature, which has been calculated by the temperature model. A characteristic curve A represents the exothermic output of the preliminary catalytic converter 4, and a characteristic curve B represents the exothermic output of a comparison catalytic converter. By way of example, the comparison catalytic converter is a preliminary catalytic converter which still just barely passes a predetermined exhaust gas test. In the case of the comparison catalytic converter as well, the exothermic output has been calculated by equation 8 in terms of a corresponding raw emissions catalytic converter that is not catalytically coated.

The exothermic output will be observed in a temperature range between a first temperature $T_1$ which, for example, is 200° C., and a second temperature $T_2$ which, for example, is 350° C. The shaded area in FIG. 4 between curve A and curve B represents a measure of the conversion capacity of the preliminary catalytic converter 4. In the case of a new preliminary catalytic converter 4, the shaded area is especially large, and in an especially severely aged preliminary catalytic converter 4, the shaded area in FIG. 4 is small, or the curve A may even be below the curve B, so that the already severely aged preliminary catalytic converter 4 is even worse than the comparison catalytic converter and thus no longer attains the predetermined exhaust gas limit values.

In order to provide a precise calculation of the exothermic output, it is advantageous to take into account the dependency of the second outlet temperature $T_{NR}$ downstream of the raw emissions catalytic converter on the air flow rate $\dot{M}_{LM}$, which is ascertained experimentally, for example.

An influence of the secondary air flow rate $\dot{M}_{SLM}$ should also be taken into account. This flow enters upstream of the preliminary catalytic converter 4 if the air/fuel ratio changes. The result is a corrected exothermic reference energy $\dot{E}_E$ in accordance with equation 9 as follows:

$$\dot{E}^*_E(T_{NR}, \dot{M}_{LM}, \lambda_v)_{REF} = \dot{E}_E(T_{NR})_{REF} \cdot \alpha(\dot{M}_{LM}, \lambda_v) \quad (9)$$

in which the variable $\alpha$ is ascertained experimentally as a function of the air flow rate $\dot{M}_{LM}$ and the lambda value $\lambda_v$ upstream of the preliminary catalytic converter 4.

A catalytic converter diagnosis value $K_D$ is obtained from the integrated temperature difference in the temperature interval between the first temperature $T_1$ and the second temperature $T_2$ in accordance with equation 10, as follows:

$$K_D = \int_{T_1}^{T_2} \dot{E}_E(T_{NR})_{Kat} - \dot{E}^*_E(T_{NR}, \dot{M}_{LM}, \lambda_v)_{REF} \, dT_{NR} \quad (10)$$

The first temperature is on the order of 50° C. and preferably 100° C., and the second temperature is on the order of 350° C., and preferably 200° C.

In order to provide a comparison, in accordance with equation 10 the catalytic converter diagnosis value $K_D$ of a comparison catalytic converter is ascertained. It is one that still just barely meets the hydrocarbon emissions requirements set by ULEV in the FTP test. Therefore, a preliminary catalytic converter 4 having a catalytic converter diagnosis value $K_D$ which is above the catalytic converter diagnosis value $K_D$ of the comparison catalytic converter is considered to be adequate in accordance with ULEV.

The second outlet temperature $T_{NK}$ which is used as a starting value for the temperature model of the uncoated catalytic converter is greater than 50° C. and preferably greater than 100° C. A temperature of 350° C. and preferably 200° C. is used for the second outlet temperature as a final temperature for the temperature model. At that time, the preliminary catalytic converter has not yet lighted off. In other words, as yet no exothermic energy is generated by the catalytic coating, and therefore the preliminary catalytic converter 4 is still exhibiting the same heating behavior as the uncoated, non-catalytically active raw emissions catalytic converter.

We claim:

1. A method for monitoring the conversion capacity of a catalytic converter for an internal combustion engine, which comprises:
   measuring an inlet temperature of an exhaust gas upstream of a catalytic converter;
   measuring a first outlet temperature of the exhaust gas downstream of the catalytic converter;
   calculating a second outlet temperature from the inlet temperature according to a temperature model;
   comparing the first outlet temperature and the second outlet temperature, and assessing a conversion capacity of the catalytic converter on the basis of the comparison; and
   utilizing the second outlet temperature to determine a conversion capacity of a raw emissions catalytic converter having no catalytic coating and operating under substantially the same conditions as the catalytic converter.

2. The method according to claim 1, which comprises calculating the energy catalytically produced in the catalytic converter from the first and second outlet temperatures, and using the calculated energy as a measure for assessing the conversion capacity.

3. The method according to claim 2, which comprises integrating the calculated energy over a predetermined temperature range, and using the integrated energy as a measure of the conversion capacity of the catalytic converter.

4. The method according to claim 1, which comprises performing the step of calculating the second outlet temperature by taking into account an exhaust gas flow rate composed of a secondary air flow rate, an aspirated engine air flow rate and a quantity of fuel supplied.

5. The method according to claim 1, which comprises performing the step of calculating the second outlet temperature by taking into account energy output by at least one of convection and radiation by the raw emissions catalytic converter.

6. The method according to claim 1, which comprises performing the step of assessing the conversion capacity of the catalytic converter by assessing a first part located at an inlet of the catalytic converter in terms of a flow direction of the exhaust gas.

7. The method according to claim 1, which comprises performing the step of assessing the conversion capacity of the catalytic converter by assessing a preliminary catalytic converter located at an inlet of the catalytic converter in terms of a flow direction of the exhaust gas.

8. The method according to claim 3, which comprises performing the integrating step only beyond an initial temperature above 50° C.

9. The method according to claim 3, which comprises performing the integrating step only beyond an initial temperature above 100° C.

10. The method according to claim 3, which comprises performing the integrating step up to a maximum temperature of 350° C.

11. The method according to claim 3, which comprises performing the integrating step up to a maximum temperature of 200° C.

12. The method according to claim 2, which comprises:
   calculating an exothermic energy of a comparison catalytic converter by using the same steps and the same temperature model as for the catalytic converter;
   barely meeting a predetermined emissions standard with the comparison catalytic converter; and
   assessing the catalytic converter as having adequate conversion capacity if the exothermic energy of the catalytic converter is greater than the exothermic energy of the comparison catalytic converter.

* * * * *

UNITED STATES PATENT AND TRADEMARK OFFICE
CERTIFICATE OF CORRECTION

PATENT NO. : 5,938,715
DATED : August 17, 1999
INVENTOR(S) : Hong Zhang et al.

It is certified that error appears in the above-identified patent and that said Letters Patent is hereby corrected as shown below:

Title page,

Item [30] should read as follows:

April 7, 1997     [DE]     Germany ..... 197 14 293

Signed and Sealed this

Fourth Day of January, 2000

Attest:

Attesting Officer     *Acting Commissioner of Patents and Trademarks*